(12) United States Patent
Udy

(10) Patent No.: US 6,948,473 B2
(45) Date of Patent: Sep. 27, 2005

(54) 4-CYCLE, ROTARY, ELECTROMAGNETIC, INTERNAL COMBUSTION ENGINES

(76) Inventor: Joseph Dale Udy, 4466 S. Helena Way, Apt. 362, Aurora, CO (US) 80015-4415

(*) Notice: Subject to any disclaimer, the term of this patent is extended or adjusted under 35 U.S.C. 154(b) by 0 days.

(21) Appl. No.: 10/916,711

(22) Filed: Aug. 12, 2004

(65) Prior Publication Data

US 2005/0016494 A1 Jan. 27, 2005

Related U.S. Application Data

(63) Continuation-in-part of application No. 10/357,547, filed on Feb. 4, 2003, now abandoned.

(51) Int. Cl.$^7$ .......................... F02B 53/00; F01C 1/073; F01C 1/063
(52) U.S. Cl. .......................... 123/245; 418/35; 418/37; 418/38
(58) Field of Search ............... 123/245; 418/34–38; 417/436; F01C 1/073, 1/063

(56) References Cited

U.S. PATENT DOCUMENTS

| | | | | |
|---|---|---|---|---|
| 2,253,445 A | | 8/1941 | Shufeldt | 418/35 |
| 2,373,791 A | | 4/1945 | Stewart | 418/35 |
| 3,186,383 A | | 6/1965 | Potter | 418/35 |
| 3,644,069 A | | 2/1972 | Stewart | 418/33 |
| 3,645,239 A | | 2/1972 | Cena | 418/36 |
| 3,873,247 A | * | 3/1975 | Boes | 418/36 |
| 3,909,162 A | * | 9/1975 | Nutku | 123/245 |
| 3,990,405 A | * | 11/1976 | Kecik | 123/245 |
| 4,308,844 A | | 1/1982 | Persinger | 123/539 |
| 4,319,551 A | | 3/1982 | Rubinshtein | 123/245 |
| 4,338,067 A | | 7/1982 | Greenfield | 418/36 |
| 4,373,879 A | * | 2/1983 | Picavet | 418/35 |
| 4,553,503 A | | 11/1985 | Cena | 123/18 A |
| 4,744,736 A | * | 5/1988 | Stauffer | 418/35 |
| 4,949,688 A | | 8/1990 | Bayless | 418/35 |
| 5,133,317 A | | 7/1992 | Sakita | 418/36 |
| 5,330,333 A | | 7/1994 | Holmes | 418/35 |
| 5,429,085 A | | 7/1995 | Stauffer | 123/245 |
| 5,484,272 A | * | 1/1996 | Horn | 418/35 |
| 6,158,987 A | * | 12/2000 | Raikamo | 418/36 |
| 6,230,683 B1 | | 5/2001 | zur Loye et al. | 123/435 |
| 6,247,444 B1 | * | 6/2001 | Parks | 123/245 |
| 6,257,195 B1 | | 7/2001 | Vanmoor | 123/239 |
| 6,257,196 B1 | | 7/2001 | Alvarado | 123/245 |
| 6,270,322 B1 | | 8/2001 | Hoyt | 123/18 A |
| 6,293,775 B1 | | 9/2001 | Bakhtine | 418/38 |
| 6,321,693 B1 | | 11/2001 | Kim et al. | 123/18 R |
| 6,341,590 B1 | | 1/2002 | Barrera et al. | 123/245 |
| 6,446,595 B1 | | 9/2002 | Sakita | 123/245 |
| 2002/0059907 A1 | | 5/2002 | Thomas | 123/43 AA |

FOREIGN PATENT DOCUMENTS

| | | | | |
|---|---|---|---|---|
| DE | 39 23 906 A1 | * | 6/1990 | F01C/1/063 |
| ES | 2 117 913 A1 | * | 8/1998 | F01C/1/073 |
| FR | 1 276 352 | * | 11/1961 | F01C/1/073 |
| JP | 404031629 A | | 2/1992 | 123/200 |
| WO | WO 9413933 A1 | * | 6/1994 | F01C/1/073 |
| WO | WO 2004067915 A1 | * | 8/2004 | F01C/1/073 |

* cited by examiner

Primary Examiner—Thai-Ba Trieu

(57) ABSTRACT

Four-cycle rotary engines, with an even number of hinged-hub impeller vanes, utilize dependently rotating, joined, hinged-hub impellers, with interdigitated, alternating hub sections, on a shared, power output shaft, and electromagnetic fields, and timing of impeller release and capture, to provide real time compression ratio control, and to control the momentum of the rotating impellers, and mechanical clutches to transfer the rotation to the power shaft.

6 Claims, 4 Drawing Sheets

A

A

B

C

4-CYCLE, ROTARY, ELECTROMAGNETIC, INTERNAL COMBUSTION ENGINES

Figure 1:
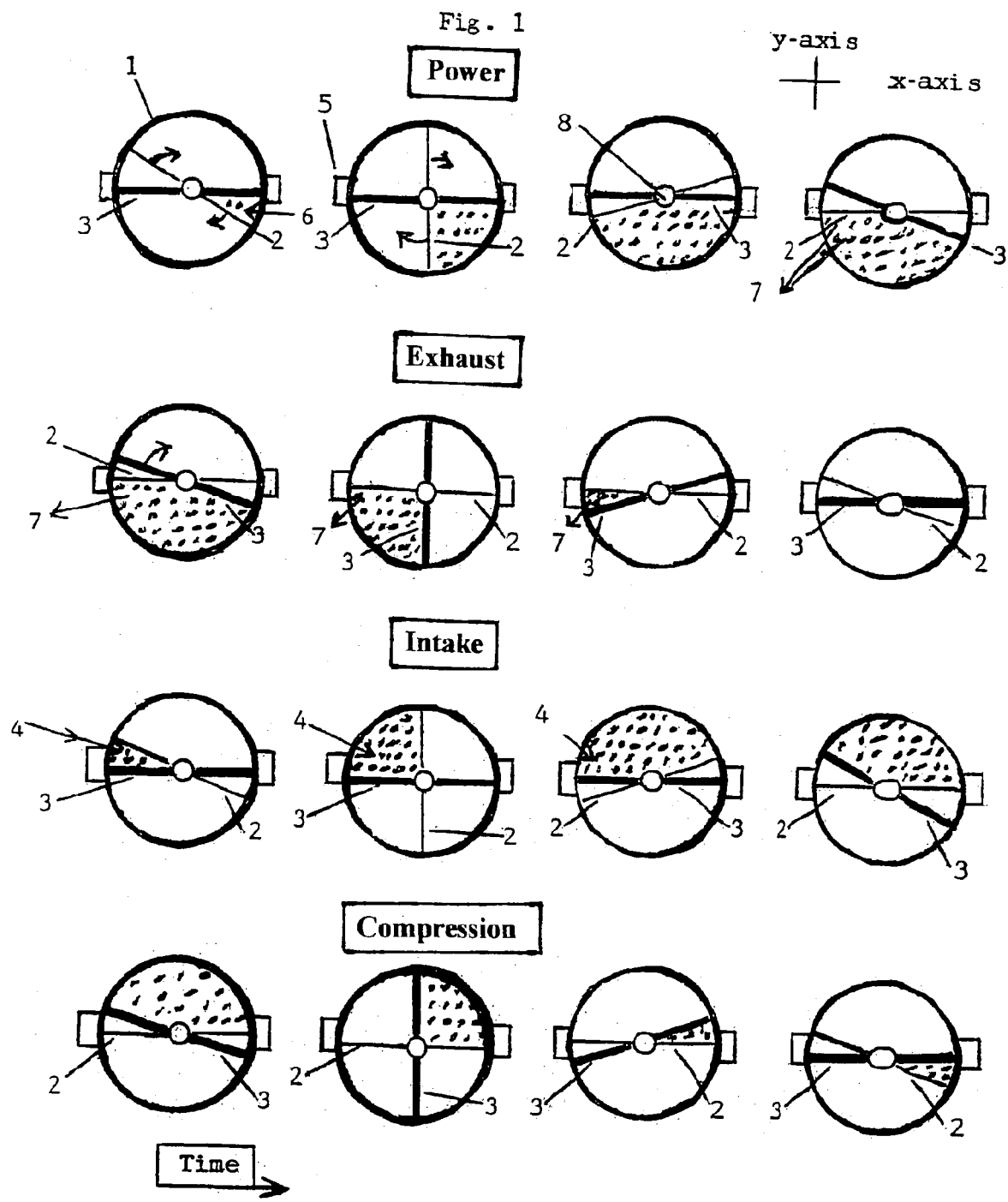

This is a Continuation-in Part Application of patent application Ser. No. 10/357,547, filed Feb. 4, 2003 now abandoned, by Joseph D. Udy.

BACKGROUND FIELD OF INVENTION

This invention relates to 4-cycle, rotary internal combustion engines and specifically to rotary internal combustion engines with dependently rotating, joined, interdigitated, alternating hub section, hinged-hub impellers on a shared, power output shaft, and with magnetic field control of impeller momentum.

BACKGROUND PRIOR ART

The prior art of rotary internal combustion engines includes more than 400 patents. Bakhtine, U.S. Pat. No. 6,293,775, is a state of the art patent that describes a dual drive shaft mechanical device. Vanmoor, U.S. Pat. No. 6,257,195, describes impellers in a continuous air injection system. Nearly all of the prior art describes mechanical devices.

Shufeldt, (U.S. Pat. No. 2,253,445) discloses " . . . impeller blades traveling in a planetary path around a globular portion of the shaft . . . ", (pg. 1, col. 1, lines 9–10) with impeller rings and end pins of the impellers in grooves of the globular shaft surface to generate shaft rotation.

Stewart, (U.S. Pat. No. 3,644,069) discloses " . . . pistons equally angularly spaced in the cylinder and fixed through a drive disk to an output shaft . . . compression disk to a tubular countershaft coaxial with the output shaft . . . raceway and rollers" (Abstract) and " . . . bars 162 and 163 are fixed to the piston 146, while the outer portions are fixed by suitable means, as by welding or the like, to the respective rings . . . " (Col. 4 lines 26–29).

Rubinshtein (U.S. Pat. No. 4,319,551) discloses annular carrying walls, pistons, piston pins, Col. 4, lines 47–50, and " . . . embodiment (shown in FIG. 15) utilizing eight pistons. Four . . . on each of two carrying walls".

Bayless (U.S. Pat. No. 4,949,688) discloses pistons, drive rods, connecting rods, connectors, and a circular ring, Col. 3–6, and " . . . The housing halves may be unitary or formed in separate parts and joined together as by welding" (Col. 3, lines 9–11). "Pistons 42 and 44 are secured as by welding to 55 to surface 53 of ring 45." (Col. 3, lines 52 and 53). "Pistons 41 and 43 are welded to surface 73 as at 75(FIG. 4) . . . (Col. 4, lines 26 and 27).

Thomas (US2002/0059907 A1) discloses "A homogenous charge compression ignition barrel engine (Abstract) . . . to introduce radicals, including ozone ($O_3$), into to the air-fuel mixture in order to vary mixture reactivity. [0121] . . . It is believed that increasing the amount of radicals advances combustion phasing in an HCCI engine and decreasing the amount of radicals delays combustion. [0122]" and " . . . the compression level in a combustion chamber may be increased by injecting a pressurized gas. [0143] . . . Other approaches . . . For example. hot high pressure exhaust gas from one chamber may be directed into a second combustion chamber . . . [0144]"

Note; the above combustion chambers contain a homogenous charge of air-fuel (by definition) before any pressurized gas is injected.

Note: The present invention discloses/uses a unique method of determining the amount of ozone added to achieve spontaneous combustion, in terms of the spontaneous combustion curve of ozone concentration vs temperature/compression ratio and a unique method of controlling the compression ratio by impeller release and capture timing (rotary engine controller).

zur Loye et al., U.S. Pat. No. 6,230,683 B1, May 15, 2001, "Premixed Charge Compression Ignition Engine With Optimal Combustion Control", zur Loye et al., do not, repeat not, discuss or conceive of the real time compression ratio control possible with the designs/embodiments of the present invention.

Further, zur Loye et al. (U.S. Pat. No. 6,230,683 B1), discloses: "A premixed charge compression ignition engine, and a control system"(Abstract) . . . and FIG. 32 "graph showing the effect of various trace species on a start of combustion and temperature;" in terms of temperature vs crank angle deg(ATDC), FIG. 33 "graph showing the effects of additional amounts of ozone on advancing the start of combustion;" in terms of temperature vs crank angle deg (ATDC)(Col.10) and "compression ratio varying device" (Col. 24,line 11).

Note: The present invention discloses/uses a method of determining ozone concentration to be added/introduced into combustion chambers of engines consisting of: reference/look-up table(s) containing, spontaneous combustion curve data for the fuel(s) in terms of ozone concentration vs temperature of combustion mixture and/or compression ratio or pressure of combustion mixture.

The paper and patent above, Thomas US2002/0059907 A1, and Zur Loye et al. (U.S. Pat. No. 6,230,683 B1), mention rotary engines but do not describe the simple, timing of impeller release and capture, method of compression ratio control possible with the hinged-hub impellers of the present invention. The simple, complete, compression ratio control that rotary engines of the present invention define is beyond the subject and apparently not obvious to/in these two patents. The present invention may be able to achieve almost any compression ratio by simple, timing adjustments (rotary engine controller) of respective hinged-hub impeller release and capture.

Persinger (U.S. Pat. No. 4,308,844) discloses: "A method . . . for . . . producing ozone gas and positively charged air particles in a supply of air to an engine", an ozone generator(Abstract).

Note: In the present invention, the ozone concentration is determined by reference to the spontaneous combustion curve data of ozone concentration verses temperature/compression ratio.

The above paper/patents: Thomas US2002/0059907 A1, Zur Loye et al. (U.S. Pat. No. 6,230,683 B1), and Persinger (U.S. Pat. No. 4,308,844) do not disclose the determination of ozone concentration in terms of spontaneous combustion curve(s) of ozone concentration vs temperature/compression ratio, approach/method of the present invention.

A patent of the current state of the art for electromagnetic rotary engines, Stewart, J. B., U.S. Pat. No. 2,373,791, Apr. 17, 1945, "ROTARY ENGINE", discloses: a rotating disk machine, rotors 20 & 120, FIG. 1, with complex contours and relatively large internal surface area, and with side by side hubs, pg. 1, RC (right column), lines 29–35, FIG. 1. " . . . securing the rotors to the shaft . . . utilizing magnetism . . . " pg. 1, RC, lines 44–50.

The present invention can have minimum internal surface area, and has joined, interdigitated, alternating hub section, impellers. The rotation of the impellers can be transferred to the power shaft by a mechanical rotation transfer system.

Stewart, '791, establishes the generic precedent for using rotary engine designs for various fluid handling tasks, pumps, etc.

Further, Stewart (U.S. Pat. No. 2,373,791) discloses " . . . central ring 1, side plates 2 and 3 and . . . rotors 20 and 120 . . . each having an annular rim . . . extending parallel to the shaft . . . each rotor has a pair of radially extending pistons 22a,22b and 122a, 122b . . . in cylinder 13"(pg. 1, Col. 2, lines 14–33) and " . . . collar 41 is keyed to shaft 10 . . . on its external surface is fixed a series of electro-magnets . . . A series of cooperating magnets is fixed upon . . . the rotor rim . . . when one rotor is secured to the frame, the other rotor will be secured to the shaft and vice versa."(pg. 2, Col.1, lines 11–56).

Note, some embodiments of the present invention have electromagnets built into (synergistic with) the hinged-hub impeller vane/blades and have helical ring clutches (mechanical devices) transferring rotation to the power shaft.

Stewart (U.S. Pat. No. 2,373,791) continues " . . . the brushes will be mounted so as to be moved angularly about the shaft for a short distance to effect the best timing of the shifting of the magnetic circuits relative to the igniting of the fuel charge. Obviously the relative lengths of the collecting and insulation segments of the rings may be varied to secure desired results."(pg. 3, col. 1, lines 29–37).

Note: The present invention may be able to achieve, real time, almost any compression ratio by simple, timing adjustments (rotary engine controller) of respective hinged-hub impeller release and capture. Hinged-hub impellers are unique and real time compression ratio control with hinged-hub impeller release and capture timing is unique. These words/concepts are not in Stewart. The present invention uses/discloses a simple method of compression ratio control, by/with respective hinged-hub impeller release and capture timing, that could be active and adaptive. Stewart does not describe, imply or infer this concept; also, the solid geometry of the Stewart rotors, appears to limit compression ratio. The present invention appears to be a simpler structure than than the Stewart device.

Sakita, U.S. Pat. No. 6,446,595 B1, Sep. 10, 2002, "Rotary Piston Engine", discloses: two rotating disks, FIG. 1, parts 30 & 32 and/or FIG. 22, parts 230 & 232.; inner and outer shafts {two}, with disks rigidly attached, FIG. 1, Col. 4. Lines 64–65.

Comment: in general, complete control of engine rotation using gears; no need for clutches or electromagnetic devices or microprocessor-sensor based control box(es) for rotary engines, even if these were added they could not overpower the gear system engagement control without breaking it. Also, there appears to be no flexibility for compression ratio variation or control in real time.

Potter, U.S. Pat. No. 3,186,383, Jun. 1, 1965, "Internal Combustion Engines", discloses: 2 rotating disks, FIG. 1, parts 11a and 11b, Col. 1, lines 63–66

Figure 6:
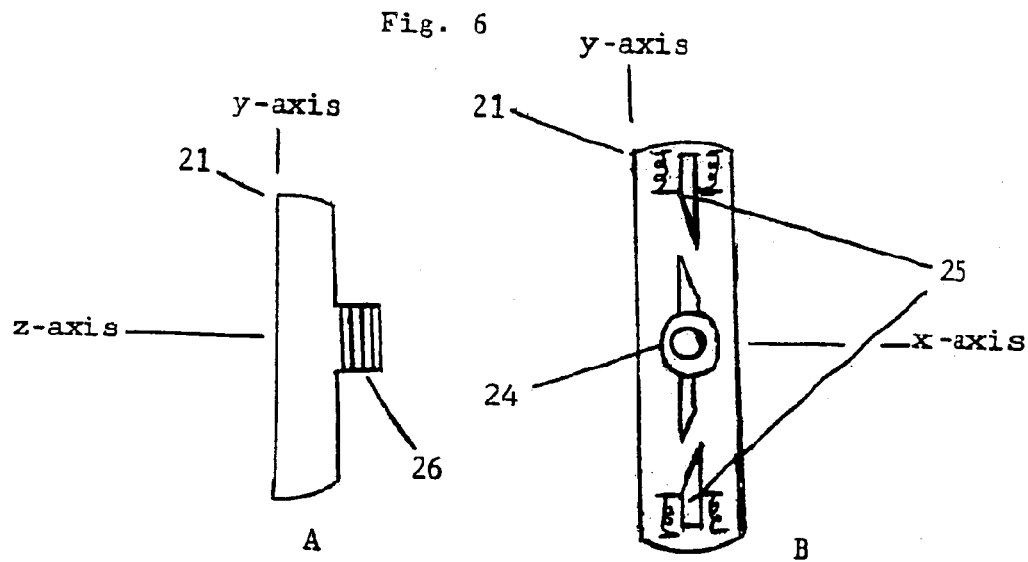

Stauffer, U.S. Pat. No. 5,429,085, Jul. 04, 1995, "Timing Mechanism for Rotary Engines", discloses: FIG. 6 and Col. 6 lines 11–12 concentric shafts {Three shafts: 26, 32, 100} Ratchet assembly 14, concentric shafts 26 & 32, converter assembly 16, microprocessor 84, Col. 3, lines 10–58, FIG. 1 and vanes 34 & 36, Col. 2, lines 46–47, & FIG. 1.

Comment; the Stauffer vanes appear to be unsupported (unattached) over a continuous, one half of its length/area, FIG. 1 & FIG. 6.

The strength to weight ratio, of the joined, interdigitated, alternating hub section(s) impellers, of the present invention, will be much higher, with increased reliability, and performance lifetime. The present invention design enables use of a single, solid power output shaft.

Comment; Stauffer establishes a generic, state of the art, rotary engine control box, utilizing sensors and microprocessor(s), a control system for rotary engines. The specific control functions and design/structure are likely to depend on the application(s) of the rotary engine(s) of the present invention.

Figure 2:
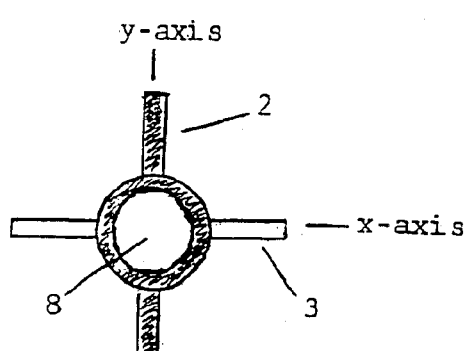
Figure 2:
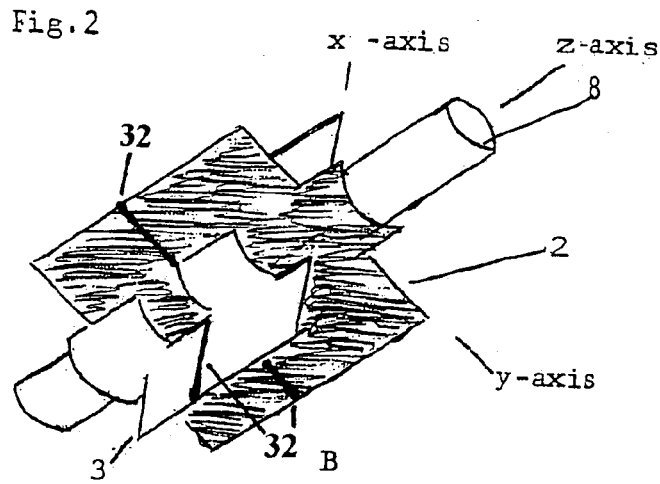
Figure 2:
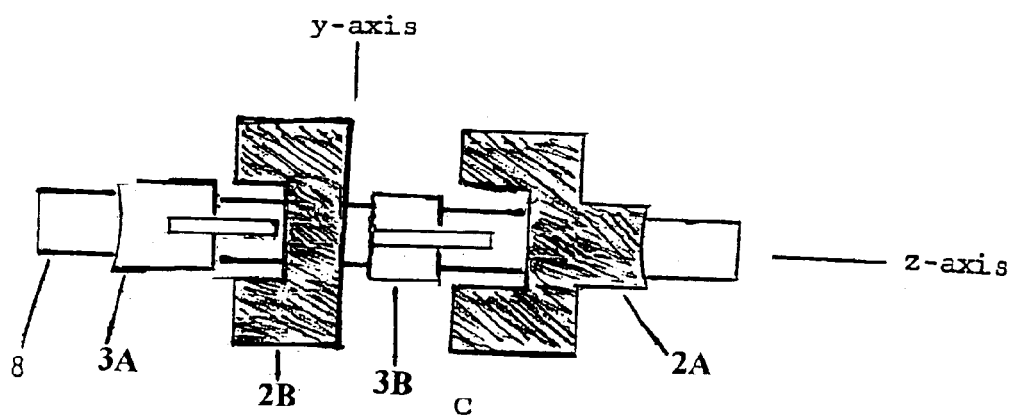

Sakita, U.S. Pat. No. 5,133,317, Jul. 28, 1992, "Rotary Piston Engine", discloses: gear train 54 and concentric, outer and inner piston shafts 36 & 38 each with piston assemblies 30 & 32, and with a gear wheels 56 & 58, Col. 4, lines 6–47+, FIG. 1, Outer and inner piston shafts 36 & 38, and rigidly attached piston assemblies 30 & 32, FIG. 2. Outer and inner piston shafts 134 & 128, and piston assemblies 120 & 122, and gear wheels 56A & 58A, FIG. 10, Col. 9, lines 7–34.

Note: engine output shaft 72 and the complex machinery to get power there, FIG. 1; Comment: in general, complete control of engine rotation using gears; no need for clutches or electromagnetic devices or microprocessor-sensor based control box(es) for rotary engines, even if these were added they could not overpower the gear system engagement control without breaking it.

Also, there appears to be no flexibility for compression ratio variation or control in real time. Note: FIG. 10 and Col. 9, lines 7–35, complexity, see Col. 9, lines 10–14 and 19–31, of inner 128 and outer 134 shafts and gears 56A & 58A and gear train to get to engine output shaft 72 compared to simplicity of the present invention design and assembly/construction protocols (unconventional simplicity).

Barrera et al., U.S. Pat. No. 6,341,590 B1, Jan. 29, 2002, "Rotary Engine" discloses: a rotary disk machine, with upper and lower center rotating members, 36 & 38, Col. 8, lines 8–9, FIG. 4, and FIG. 6. Two concentric power shafts, 24 & 26, Col. 8, lines 4–6, FIG. 1.

Figure 3:
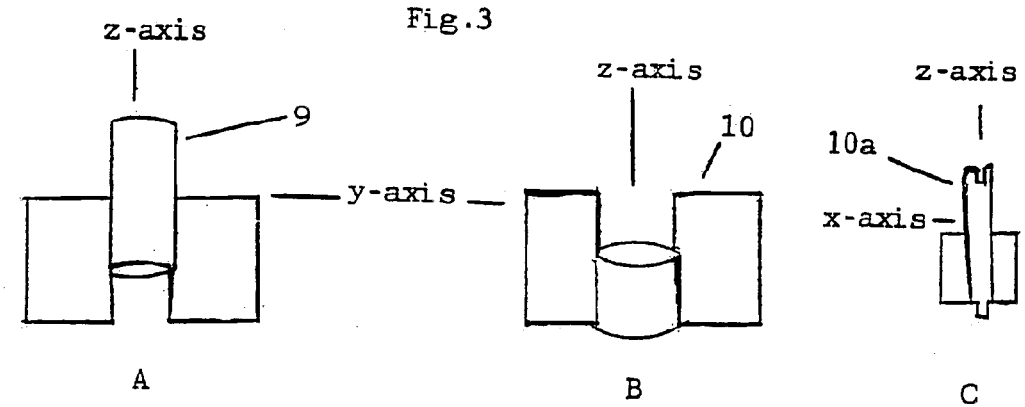

Cena, U.S. Pat. No. 3,645,239, Feb. 29, 1972, "Rotary Piston Machine" discloses: rotating annular cylinder block 2, Abstract, Col. 2, line 59+, FIG. 3.

Hoyt, U.S. Pat. No. 6,270,322 B1, Aug. 07, 2001, "Internal Combustion Engine Driven Hydraulic Pump", discloses: Abstract; reciprocating Rotary engine and " . . . trunnion bearing mount 80 providing a hinge motion . . . " Col. 19 lines 47–48, FIG. 23; " . . . a first reciprocating rotor 10 ("reciprotor") and a second rotor or reciprotor 11." Col. 6, lines 50–51, FIG. 2 & 3.

Comment: This is basically a reciprocating rotary disk machine, a rather complex and convoluted, reciprocating rotary disk machine.

Kim et al., U.S. Pat. No. 6,321,693, Nov. 27, 2001, "Reciprocating Rotary Piston System And Pressure Pump And Internal Combustion Engine Using The Same", discloses: "A reciprocating rotary piston system . . . ", Abstract, piston support bodies 2 & 20, Col. 5, line 37, FIG. 1 &5, and annular disks 2A & 2B, Col. 4, line 33, FIG. 1, and "Third lug 6A is connected to one end of a connecting pin 7A, and the other end of connection pin 7A is hinge-jointed to a crank rod 8C . . . ", Col. 5, lines 10–13, FIG. 1 & 2.

Comment; The above appears to be a connecting rod and pin arrangement and does not, repeat not anticipate the present invention. In general, the Kim machine appears to be, basically, a rotating disk (2A & 2B) machine/device, to repeat, a rotary disk design, parts 2 & 20, FIG. 1.

Cena, U.S. Pat. No. 4,553,503, Nov. 19, 1985, "Rotary Piston Machine", discloses: " . . . arcuate pistons inside a rotating annular cylinder block . . . " and " . . . scissor-action-type eccentric cranks . . . ", Abstract.

Holmes, U.S. Pat. No. 5,330,333, Jul. 19, 1994, "Indexing Rotary Actuator with Clutch Pistons", discloses: reciprocating clutch pistons, Col. 4, lines 64–68+.

General comment: this and other devices, for example, roller cam one-way clutches, establish a wide spectrum of rotation systems for the hinged-hub impellers, of the present invention, to rotate the power output shaft. The specific geometry and design are likely to be dependent upon the application of the present invention.

Alvarado, U.S. Pat. No. 6,257,196 B1, Jul. 10, 2001, "Rotary Disc Engine", discloses: " . . . a pair of cylindrical shaped rotary discs 40 . . . " Col. 3, lines 14—14 FIG. 1.

Figure 5:
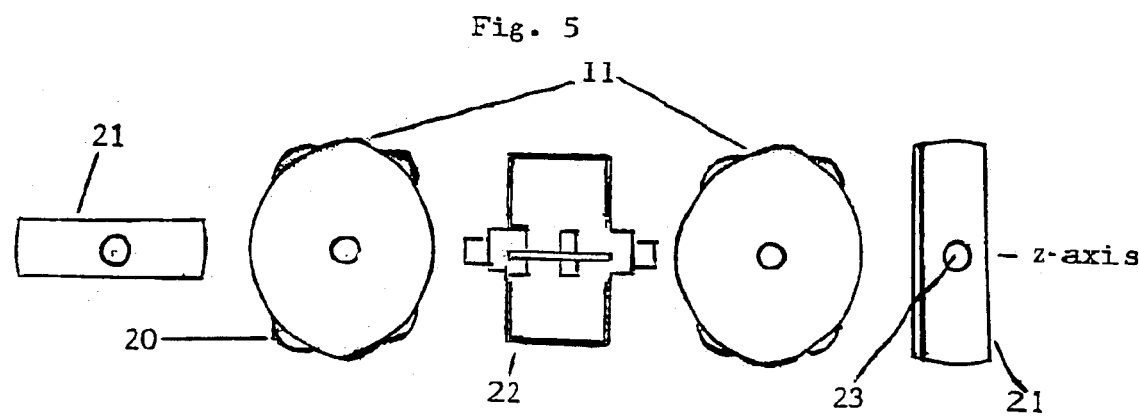

Greenfield, U.S. Pat. No. 4,338,067, Jul. 6, 1982, "Alternating Piston Machine With Rotating End Walls And Chain Drive", discloses: "Wheels 16,18 . . . ", Col. 2, line 34. FIG. 5 and " . . . either axle 58 or axle 60 may be utilized as an output shaft" Col. 3, lines 5–6, FIG. 6. Comment: basically, two rotating disks (wheels 16 & 18 and attachments, FIG. 5), and a chain drive mechanism with rigid gearing.

Fujita, JP404031629A, Feb. 03, 1992, "Rotary Engine", appears to have two concentric rotor shafts 10 & 11, and rotors 7 & 8 with a continuous half of the rotor length (or area) being rigidly attached to the respective rotor shaft, and gears 14 & 15 also rigidly attached to the respective rotor shaft, also has gear and pin-in-slot system 16–37 to rotate the output shaft 28, FIG. 1.

Comment: Fujita has the rigid attachment to concentric shafts typical of rotary disk machines. Basically side by side rotating hubs. A continuous one half of the rotor length or area appears to be unsupported, and therefore likely to be weak at the transition line and failure prone and/or have a relatively low strength to weight ratio as compared to the present invention.

Observations: These referenced patents and other prior art establish a broad generic spectrum of approaches and methods, including, what may be labeled, rotation transfer systems, and exhaust systems, and ignition systems, and intake systems, and control systems, and combustion/expansion mixture creation systems to supply and ignite combustion mixtures into/in rotary internal combustion engines/machines.

In general, these are common-place, and well understood, cycles/functions/systems of generic internal combustion engines/machines. For the many embodiments of the present invention, the specific structure(s) to perform/enable these cycles/functions would most likely be application dependent and a design choice for each embodiment. In a similar perspective, these referenced patents and other prior art establish a broad generic spectrum of approaches and methods including exhaust systems to control and direct combustion products within/from rotary internal combustion engines/machines. In general, this is a common, and well understood, cycle/function/system of these machines. For the many embodiments of the present invention, the specific structure to perform/enable this exhaust cycle/function/system from the exhaust sector would most likely be application dependent for each embodiment and may be considered a design choice.

The state of the art, describes a rich repertoire of relevant rotary engine functions and associated structures. The common functions and structures, might be generically described as:

a means to enclose a space;

a rotation transfer system; (enabling the joined, interdigitated, alternating hub section, hinged-hub impellers of the present invention to rotate the power output shaft);

a control system to control engine functions;

a combustion/expansion mixture creation system, (including an intake slot and intake system) to supply and ignite combustion mixtures, i.e. ignition system, (including spontaneous combustion) to/in the minimized combustion/expansion, sector/volume;

an exhaust system;

and a rotary engine control system (inclusive).

The specific embodiments/structures may be considered application dependent and as design choices. This present invention may be one small step in the evolution of devices through ox-cart harnesses through wagon tongues through reciprocating piston crankshafts through joined, interdigitated, alternating hub section, hinged-hub impellers in rotary engines/machines.

Objects and Advantages:

This present engine appears to be unique, and novel, in expanding the class of rotary internal combustion engines as mechanical-electromagnetic devices.

This preliminary, simple, embodiment, has about ten moving parts, including clutches and the power shaft, and illustrates the engine concept. There are a very large number of embodiments, each with variations in dimension and configuration and materials. All embodiments would be designed to be useful in some selected applications.

The present invention discloses/uses a unique method of determining the amount of ozone added to achieve spontaneous combustion, in terms of the spontaneous combustion curve of ozone concentration vs temperature/compression ratio and a unique method of controlling the compression ratio by impeller release and capture timing (rotary engine controller and/or a timing system/means).

The present invention discloses/uses a method of determining ozone concentration to be added/introduced into combustion chambers of engines consisting of: reference/look-up table(s)/graph(s) containing, spontaneous combustion curve data for the fuel(s) in terms of ozone concentration versus temperature of the combustion mixture and/or compression ratio or pressure of the combustion/expansion mixtures.

The present invention may be able to achieve, real time, almost any compression ratio by simple, timing adjustments (rotary engine controller) of respective hinged-hub impeller release and capture. Hinged-hub impellers are unique and real time compression ratio control with hinged-hub impeller release and capture timing is unique. (Stauffer, U.S. Pat. No. 5,429,085, establishes a generic, state of the art, rotary engine control box, utilizing sensors and microprocessor(s), a control system for rotary engines.) The specific control functions and design are likely to depend on the application of the rotary engines/machines of the present invention and may be considered a design choice.

The present invention uses/discloses a simple method of real time compression ratio control, by/with respective hinged-hub impeller release and capture, timing means, which could be active and adaptive.

The present invention, as an engine, appears to be a simpler design concept than prior state of the art electromagnetic rotary engines,(i.e. Stewart device, U.S. Pat. No. 2,373,791). Stewart, et al., establishes the generic precedent for using rotary engine designs for various fluid handling tasks, pumps, etc.

SUMMARY

Four-cycle, rotary, electromagnetic, internal combustion engines, utilize dependently rotating, joined, interdigitated, alternating hub section, hinged-hub impellers, with an even number vanes/blades, on a shared power shaft, and electromagnetic fields and/or timing of impeller release and capture, to control the momentum of the rotating impellers and mechanical means to transfer the impeller rotation to the power shaft.

DRAWINGS BRIEF

FIG. 1, a rotary, 4-cycle, internal combustion, engine cycle.

FIGS. 2A–2C, views of interdigitated, alternating hub section, hinged-hub impellers on power shaft assembly.

FIGS. 3A–3C, views of hinged-hub impeller nodes.

Figure 4:
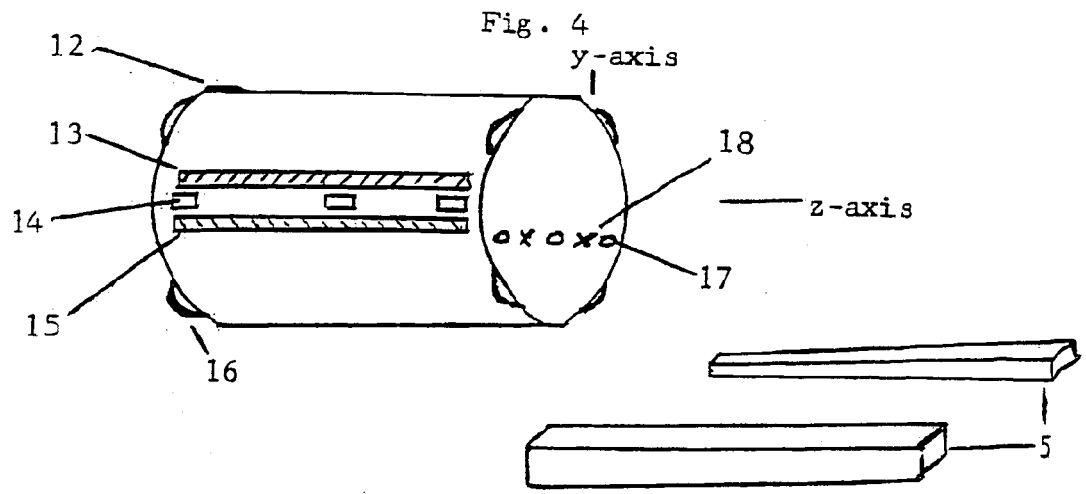

FIG. 4, view of engine case.

FIG. 5, view of end caps and clutches.

FIG. 6A–6B, profile and transparent views of clutch, e.g., rotation transfer means.

FIGS. 7A–7C, views of engine assembly.

DRAWINGS DETAILED

FIG. 1. 4-cycle, rotary, internal combustion, engine cycle: utilizing a pair (two) of 2 vane hinged-hub impellers rotating alternately 180 degrees clockwise, on a shared power output shaft. Illustrated separately, these functions occur simultaneously in respective sectors.

FIG. 1; the engine case interior wall 1, a means to enclose a space, contains a rotatable power output shaft 8 (projecting along the z axis) with two, dependently rotating (independent hubs), two vaned, interdigitated/meshed, alternating hub section, hinged-hub impellers 2 and 3, whereby power/combustion/expansion, intake sectors, and exhaust, compression, sectors are maximized and minimized, respectively.

The power function starts with electromagnets 5, locking both vanes (sides) of impeller 3 into position (static). Impeller 2 (dynamic) rotates slightly by magnetic repulsion, and fuel is injected 6, into a compressed air charge (from the compression sector), ignition/spontaneous combustion occurs. Combustion products, force (power) impeller 2 to rotate, at about 160 degrees the electromagnets 5 reverse the magnetic field, impeller 3 is repulsed (now dynamic), the magnetic field is reversed again and impeller 2 is locked into position (now static) by the electromagnets 5 and the function repeats. The other sectors execute the respective, simultaneous, functions, as illustrated.

The power sector provides power for the exhaust sector and the intake sector and the compression sector and output power at the power shaft.

FIG. 2A & B show views of the joined, interdigitated, alternating hub section, hinged-hub impellers, 2 and 3. FIG. 2B illustrates the friction stir weld lines 32 to create the respective, monolithic, impeller vane/blades, assembled onto the power shaft 8, the impellers are free to dependently rotate. FIG. 2C illustrates the respective impeller nodes in sequence, 3A-2B-3B-2A, stacked on the power shaft 8 prior to friction stir welding of the respective impeller node vane joints to form the joined, interdigitated, alternating hub section, hinged-hub impellers with a pair of monolithic, two vane/blade impellers, 2 and 3. The number, size, and dimension of the alternating impeller nodes and the number of vanes/blades will likely be a design choice and application dependent.

FIG. 3A–3C shows views of the hinged-hub impeller nodes used to assemble the hinged-hub impellers 2 and 3. The end impeller nodes 9, have an extended hub to reach through the end cap 11. The interior impeller nodes 10, can be stacked/sequenced, alternately with gas tight seals (not shown), appropriately to build the joined, interdigitated, alternating hub section, hinged-hub impellers, 2 and 3, on the power shaft 8, FIG. 2C.

The respective vanes of the hinged-hub impeller nodes could have machined joints 10a and be friction stir welded, fused, to form monolithic impeller vanes with interdigitated, alternating hub sections, a hinge-like rotation joint. The above are necessary methods, under M.P.E.P. 809.03(B), for forming/producing, the joined, interdigitated, hinged-hub section, impellers (with two blades/vanes per impeller) of the present invention.

To achieve magnetic field control of impeller momentum during rotation (engine operation) electromagnets built into the impeller vanes will likely be required. Depending on the vane/impeller material, these vane electromagnets may be homogeneous, except for implanted wire coils (insulated). The contacts (not shown), for the electromagnet wire coils (not shown) of the impeller vane electromagnets, could be deep in the machined joints 10a, and the vane surfaces, friction stir welded. The control circuit could be internally wired to the respective impeller hub and to the rotating electrical contacts 26 on the outside of the clutch assembly 21 (FIG. 5).

Comment: The concept/device of electromagnets built into impeller vanes/blades is unique, and does not appear in the prior art. (Stewart (U.S. Pat. No. 2,373,791) discloses electromagnets on a rotor which corotates with the pistons (pg. 1, Col. 2, lines 10–55). The concept of placing electromagnets into the Stewart pistons, is problematic, complex and not obvious, due to the control wire path limitations of the Stewart design. (No one has proposed this concept in more than 55 years.) In the present (literally) invention, the structural simplicity of the joined, interdigitated, hinged-hub impellers and the simplicity of electromagnetic control encourages the synergistic development of integral impeller vane electromagnets and control systems.

FIG. 4 shows the engine case 12 with the intake slot 13 and the exhaust slot 15. These slots have angled ribs, to support and clean the impeller vane seals. The electromagnet mounts 14 are on both sides of the engine case 12 and accept the electromagnets 5. The end cap mounts 16 are on both ends of the engine case 12. The fuel injector ports 17 and the fuel igniters 18 (a system/means to supply and ignite combustion mixtures in the minimized combustion/expansion sector) are slightly offset below the plane of the electromagnet mounts 14.

FIG. 5 shows the engine case end caps 11, which fit over the impeller hub-power shaft assembly and attach to the engine case 12, to form gas tight seals with the engine case and the impeller vanes. (The impeller vanes, 2 & 3, to engine case interior wall, 1, are also gas tight seals.) The magnetically disengaged, clutch ring assembly 21, an example of a rotation transfer means, fits the impeller hub in the vane plane of that hub and when engaged, rotates with the impeller hub, transferring the dynamic impeller rotation to the power shaft.

FIG. 6, right, shows a transparent view of the clutch assembly 21, an example of a rotation transfer system. The clutch actuator wedges 25, are shown in the magnetically attracted, disengaged position. When magnetically released, the spring-loaded actuator wedges 25 move the fingers of the flat, helical clutch coil/ring 24, decreasing the coil/ring radius and gripping the power shaft, providing a rotation transfer system/means for the dynamic, interdigitated, alternating hub section, hinged hub impeller(s) to rotate the power output shaft. The electromagnets 5 extend slightly beyond the end caps 11 to attract and disengage the clutch actuator wedges, and, if needed, could engage the end of the clutch assembly (magnetic, pivot arm, not shown) to stop, reverse rotation of the impeller during combustion in the power sector.

The rotating electric contacts 26 on the clutch assembly 21 extension could be used to control the impeller vane electromagnets, if needed.

Figure 7:
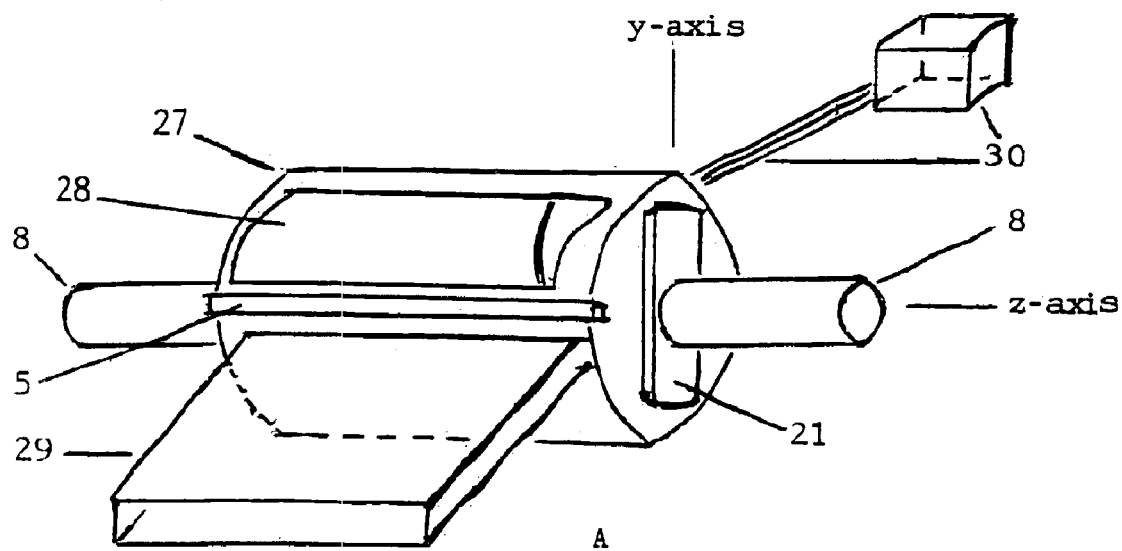
Figure 7:
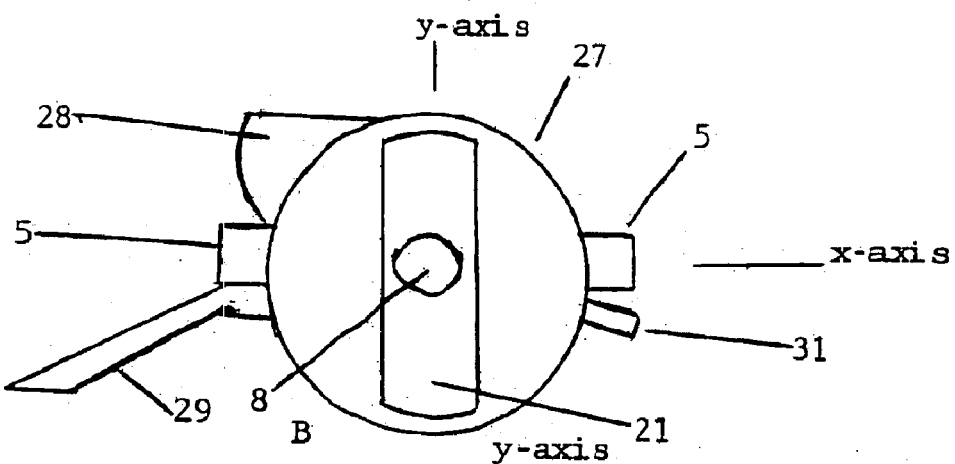
Figure 7:
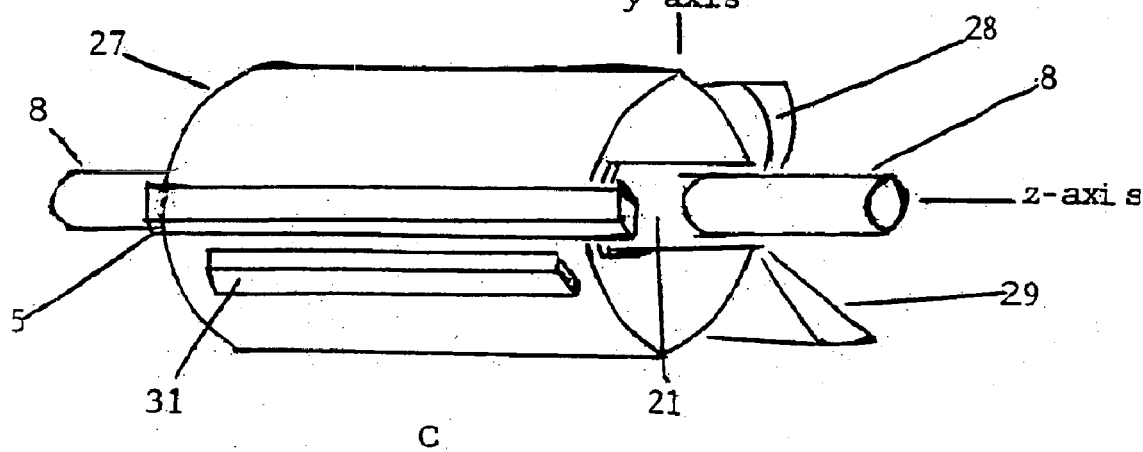

FIG. 7 shows an embodiment, with a usable, output power shaft 8 at each end, of the engine assembly 27, and with a combined air intake, filter, ozone generator unit, 28. The exhaust gas chute, 29, provides an exhaust system to direct and control exhaust gases (combustion products) from the exhaust slot 15 in the exhaust sector. Other embodiments may have exhaust gases impelled from the engines in different manners. The rotary engine control box and wiring harness 30, control: ozone concentration, electromagnets, rotations, compression ratio, fuel injectors, and fuel igniters (if needed), and other functions (impeller timing), as needed and provides a control system to control engine functions and initial electrical power, a generator-starter (not shown) could be on one end of the power shaft, or belt driven from the power shaft, or perhaps the electrical current possibly generated by the rotating vane electromagnets could be utilized.

The referenced patents and other prior art establish a broad generic spectrum of approaches and methods, including, what may be labeled; rotation transfer systems/means, and exhaust systems/means, and ignition systems/means, and intake systems/means, and control systems/means, and timing systems/means, and combustion/expansion mixture creation systems/means to supply and ignite combustion mixtures into/in rotary internal combustion engines/machines. In general, these are common-place, and well understood, cycles/functions/systems of generic internal combustion engines/machines.

For the many embodiments of the present invention, the specific structure to perform/enable these cycles/functions would most likely be application dependent and a design choice for each embodiment. In a similar perspective, these referenced patents and other prior art establish a broad generic spectrum of approaches and methods including exhaust systems to control and direct combustion products within/from rotary internal combustion engines/machines. In general, this is a common, and well understood, cycle/function/system of these machines. For the many embodiments of the present invention, the specific structure to perform/enable this exhaust cycle/function/system/means would most likely be application dependent for each embodiment and may be considered a design choice.

In general, these referenced patents and other prior art, of the state of the art, describe a rich repertoire of relevant rotary engine functions and associated structures. The common functions and structures, might be generically described as:

a means to enclose a space;
a rotation transfer system; (enabling the joined, interdigitated, alternating hub section, hinged-hub impellers of the present invention to rotate the power output shaft);
a control system to control engine functions;
a combustion/expansion mixture creation system, (including an intake slot and intake system) to supply and ignite combustion mixtures, and ignition system, (including spontaneous combustion) to/in the minimized combustion/expansion sector/volume;
an exhaust system;
and a rotary engine control system (inclusive).

The specific embodiments/structures may be considered application dependent and as design choices. This present invention may be one small step in the evolution of devices through ox-cart harnesses through wagon tongues through reciprocating piston crankshafts through joined, interdigitated, alternating hub section, hinged-hub impellers in rotary engines/machines.

Another perspective, this present invention may also be described as:

a four-cycle rotary, electromagnetic, internal combustion engine comprising:
  a cylindrical, round cross-sectional chamber engine case;
  end caps mounted on both ends of the cylindrical engine case whereby a engine working volume is enclosed;
  an output power shaft with joined, interdigitated, alternating hub section impellers having a plurality of impeller vanes, said power shaft and impellers being rotatable within the engine case, wherein the engine working volume is partitioned into simultaneous, intake, compression, power/combustion/expansion, and exhaust sectors;
  the impeller vanes comprising electromagnets as, or built into, the vane sections of the alternating hub section impellers;
  at least one intake slot, wherein the air is controlled and delivered into said intake sector;
  at least one fuel injector, whereby fuel is controlled and delivered into said power/combustion/expansion sector;
  at least one exhaust slot, wherein the combustion/expansion products are controlled and directed from the exhaust sector into the exhaust gas chute;
  at least one fuel igniter, whereby the combustion mixtures in the power/combustion/expansion sector are optionally ignited;
  timing means for controlling the intake air in the intake sector, and the compression ratio in the compression sector, and the fuel injection into the power/combustion/expansion sector, and the combustion/expansion products from the exhaust sector, as a function of the relative timing of the static impeller release and the dynamic impeller capture;
  rotation transfer system/means whereby rotation of the dynamic impeller, due to combustion/expansion in the power/combustion/expansion sector, is transferred to the power shaft, e.g. a clutch ring assembly with clutch actuator wedges, and a helical clutch coil, whereby a decreasing radius grips the output power shaft and transfers rotation (rotational momentum) to the output power shaft and;
  computer control units to control said engine, functions, including timing of the static impeller release, and capture of the dynamic impeller to control the compression ratio and initiate spontaneous combustion of the combustion mixtures in the power/combustion/expansion sectors, and momentum transfer between the impeller vanes, and the power shaft, and the rotations of the impellers and the power shaft.

The impeller vanes above comprising electromagnets as, or built into, the vane/blade sections of the alternating hub section impellers.

The four-cycle, rotary, electromagnetic, internal combustion engine according to the above further comprising:

reference and look-up tables for the spontaneous combustion curve of the fuel, in terms of ozone concentration introduced into the combustion chamber/mixture versus the temperature of the combustion mixture and/or the compression ratio or pressure of the combustion mixture;

temperature and pressure sensors provided at the combustion sector whereby temperature and pressure, of the combustion mixture, are detected;

carbon monoxide and nitrogen oxides sensors provided at the exhaust sector whereby carbon monoxide and nitrogen oxides are detected in the combustion exhaust products;

ozone generator provided at the intake slot whereby ozone is introduced/added to the intake air and;

ozone concentration sensors provided at the intake slot, wherein the ozone concentration is adjusted to initiate spontaneous combustion in the power/combustion/expansion sector and to minimize carbon monoxide and nitrogen oxides in the combustion exhaust products.

A method of producing/manufacturing a four-cycle rotary, electromagnetic, internal combustion engine comprising steps of:

providing a cylindrical, round cross-sectional chamber engine case;

providing end caps mounted on both ends of the cylindrical engine case whereby a engine working volume is enclosed;

providing an output power shaft with joined, interdigitated, alternating hub section, impellers having a plurality of impeller vanes, said power shaft and impellers being rotatable within the engine case, wherein the engine working volume is partitioned into simultaneous, intake, compression, power/combustion/expansion, and exhaust sectors;

providing said plurality of impeller vanes as electromagnets, or with electromagnets built into the vane/blade section of said impeller;

providing at least one intake slot, wherein the air is controlled and delivered into said intake sector;

providing at least one fuel injector, whereby fuel is controlled and delivered into said power/combustion/expansion sector;

providing at least one exhaust slot, wherein the combustion/expansion products are controlled and directed from the exhaust sector into the exhaust gas chute;

providing at least one fuel igniter, whereby the combustion mixtures in the power/combustion/expansion sector are optionally ignited;

providing timing means for controlling the intake air in the intake sector, and the compression ratio in the compression sector, and the fuel injection into the power/combustion/expansion sector, and the combustion/expansion products from the exhaust sector, as a function of the relative timing of the static impeller release and the dynamic impeller capture;

providing rotation transfer system/means whereby rotation of the dynamic impeller, due to combustion/expansion in the power/combustion/expansion sector, is transferred to the power shaft and;

providing computer control units to control said engine, functions, including timing of the static impeller release and capture of the dynamic impeller to control the compression ratio and initiate spontaneous combustion of the combustion mixtures in the combustion sectors, and momentum transfer between the impeller vanes, and the rotations of the impellers and the power shaft, and rotation transfer between the dynamic impeller and the output power shaft.

The method of producing a four-cycle, rotary, electromagnetic, internal combustion engine according to the above, wherein the step of providing rotation transfer means comprising a clutch ring assembly with clutch actuator wedges activating a helical clutch coil with a decreasing radius gripping the output power shaft and transferring rotation (rotational momentum) to the output power shaft, and;

providing computer control units to control said engine, functions, including timing of the static impeller release and capture of the dynamic impeller to control the compression ratio and initiate spontaneous combustion of the combustion mixtures in the power/combustion/expansion sectors, and momentum transfer between the impeller vanes, and the power shaft.

The method of producing a four-cycle rotary, electromagnetic, internal combustion engine according to the above, wherein the step of producing the joined, interdigitated, alternating hub section, impellers, with a plurality of vanes comprising steps of:

appropriately sequencing/stacking, alternate impeller nodes on a single/shared shaft and;

fusing/welding the respective impeller node vane joints whereby joined, interdigitated, alternating hub section, dependently rotating, multi-vane/blade impellers are created/produced/manufactured.

Operation:

The engine cycle of pages 21–22, & FIG. 1, describes the mechanical operation, rotations, of this illustrated, simple embodiment.

The electromagnetic fields are intended to aid in the transfer of momentum from the dynamic impeller to the static impeller. As the dynamic impeller approaches the static impeller, electromagnets on the engine case briefly reverse field, releasing and repelling the static impeller, momentum is transferred by the compressed air charge of the compression sector and magnetic field repulsion of the incoming dynamic impeller (during closest approach both impeller vanes have the same electromagnetic field and magnetically repel). The electromagnets on the engine case shut down briefly after repelling the static impeller. These electromagnets now generate a magnetic field to capture the incoming impeller (now static) and the cycle repeats.

Comment; there are likely to be some embodiments which alter this magnetic field cycle. The compression ratio of the flat faced impeller vanes is likely to be about 7:1; with optimized, custom-milled impeller vane faces, the compression ratio could be very high. The momentum transfer by the compressed air charge may be adequate, (balance point of compression ratio and momentum transfer and power shaft output) to eliminate need for impeller vane electromagnets The engine case electromagnets would release and capture the respective impeller vanes. Other embodiments could have a plurality of electromagnets built into the engine case and/or into the interior wall of the engine case, to sequence clutch disengagement relative to impeller vane capture. This class of devices might be named "electromagnetic field ratchets or clutches".

One embodiment of clutch operation is described on page 26, & FIG. 6, alternate embodiments, of rotation transfer systems/means are known, including the group containing pressure plate clutches, and roller cam clutches, and ratchets, and gears/chains and magnetic devices, et al.

It is the Applicant's understanding that ozone has a half-life of about 20 minutes at standard conditions, and that none (zero) of the ozone generated in the intake air would survive the combustion sector to exit with the exhaust. Ozone is a very powerful oxidant, and at appropriate concentrations should initiate spontaneous combustion of hydrocarbon fuels and hydrogen fuels, well below the conditions necessary to form nitrogen oxide pollutants. Exhaust from hydrogen fuel engines may be "cleaner" than the intake air at some locations.

While it may vary for each fuel type. The spontaneous combustion curve of ozone concentration verses temperature/compression ratio is likely to be about:

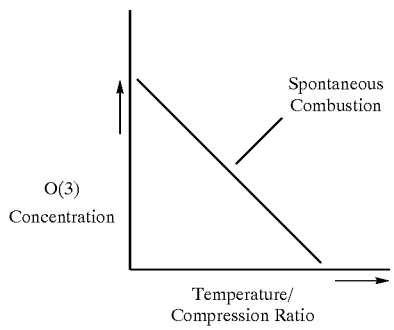

Note: the term "temperature/compression ratio" represents two parallel scales, temperature of the combustion mixture and/or compression ratio (or pressure) of the combustion mixture.

With ozone sensors at the intake slot, temperature, pressure sensors at the combustion sector, and ozone, carbon monoxide, and nitrogen oxides sensors in the exhaust gas stream, the intake ozone concentration could be adjusted to initiate spontaneous combustion, minimize carbon monoxide and minimize nitrogen oxides.

Fuel injectors are the preferred method of fuel delivery and operate classically.

The preferred fuel igniters could be scanning, ultra-short pulse lasers. These lasers can be small (<shoebox) and could ignite an entire scanned volume of fuel-air mixture(s).
Conclusion, Ramifications and Scope:

Mechanical-electromagnetic, rotary, (MER), internal combustion engines appear to be a largely unexplored class of engines. The use of high temperature materials and self-lubricating bearings may spawn truly remarkable engines. A MER engine with a pair of 4 bladed, hinged-hub, impellers may have an improved balance of forces. Exhaust sound suppression systems could likely contribute to environmental improvement, for example: "Neoplanar" TM, "a thin film (⅛ inch) magnetic transducer", made by American Technology Corp., may produce "anti-sound".

MER engines demand to be designed, from the beginning, to be more efficient, cleaner, and quieter than contemporary internal combustion engines.

Multiple MER engines, connected together appropriately, may "smooth out", and produce high, power output. Multiple, separate, MER engines, in synchronous operation, for example; one engine at each drive wheel, may inspire totally new vehicles.

What is claimed is:

1. A method of producing a four-cycle rotary, electromagnetic, internal combustion engine comprising steps of:
   providing a cylindrical round cross-sectional chamber engine case;
   providing end caps mounted on both ends of the cylindrical engine case whereby an engine working volume is enclosed;
   providing an output power shaft with joined, interdigitated, alternating hub section, impellers having a plurality of impeller vanes, said power shaft and impellers being rotatable within the engine case, wherein the engine working volume is partitioned into simultaneous, intake, compression, combustion, and exhaust sectors;
   providing said plurality of impeller vanes as electromagnets, or with electromagnets built into the vane sections of said impeller;
   providing at least one intake slot, wherein the air is controlled and delivered into said intake sector;
   providing at least one fuel injector, whereby fuel is controlled and delivered into said combustion sector;
   providing at least one exhaust slot, wherein the combustion products are controlled and directed from the exhaust sector into the exhaust gas chute;
   providing at least one fuel igniter, whereby the combustion mixtures in the combustion sector are optionally ignited;
   providing timing means for controlling the intake air in the intake sector, and the compression ratio in the compression sector, and the fuel injection into the combustion sector, and the combustion products from the exhaust sector, as a function of the relative timing of the static impeller release and the dynamic impeller capture;
   providing rotation transfer means whereby rotation of the dynamic impeller, due to combustion in the combustion sector, is transferred to the power shaft, and;
   providing computer control units to control said engine, functions, including timing of the static impeller release and capture of the dynamic impeller to control the compression ratio and initiate spontaneous combustion of the combustion mixtures in the combustion sectors, and momentum transfer between the impeller vanes, and the rotations of the impellers and the power shaft, and rotation transfer between the dynamic impeller and the output power shaft.

2. The method of producing a four-cycle, rotary, electromagnetic, internal combustion engine according to claim 1, wherein the step of providing rotation transfer means comprising:
   a clutch ring assembly with clutch actuator wedges activating a helical clutch coil with a decreasing radius gripping the output power shaft and transferring rotation to the output power shaft.

3. The method of producing a four-cycle rotary, electromagnetic, internal combustion engine according to claim 1, wherein the step of producing the joined, interdigitated, alternating hub section, impellers, with a plurality of vanes comprising:
   appropriately sequencing, alternate impeller nodes on a single shaft and;
   welding the respective impeller node vane joints whereby joined, interdigitated, alternating hub section, dependently rotating, multi-vane impellers are created/produced.

4. A four-cycle, rotary, electromagnetic, internal combustion engine comprising:

a cylindrical round cross-sectional chamber engine case;

end caps mounted on both ends of the cylindrical engine case whereby an engine working volume is enclosed;

an output power shaft with joined, interdigitated, alternating hub section impellers, having a plurality of impeller vanes, said power shaft and impellers being rotatable within the engine case, wherein the engine working volume is partitioned into simultaneous, intake, compression, combustion, and exhaust sectors;

the impeller vanes comprising electromagnets as, or built into, the vane sections of the alternating hub section impellers;

at least one intake slot, wherein the air is controlled and delivered into said intake sector;

at least one fuel injector, whereby fuel is controlled and delivered into said combustion sector;

at least one exhaust slot, wherein the combustion products are controlled and directed from the exhaust sector into the exhaust gas chute;

at least one fuel igniter, whereby the combustion mixtures in the combustion sector are optionally ignited;

timing means for controlling the intake air in the intake sector, and the compression ratio in the compression sector, and the fuel injection into the combustion sector, and the combustion products from the exhaust sector, as a function of the relative timing of the static impeller release and the dynamic impeller capture;

rotation transfer means whereby rotation of the dynamic impeller, due to combustion in the combustion sector, is transferred to the power shaft and;

computer control units to control said engine, functions, including timing of the static impeller release and capture of the dynamic impeller to control the compression ratio and initiate spontaneous combustion of the combustion mixtures in the combustion sectors, and momentum transfer between the impeller vanes, and the rotations of the impellers and the power shaft.

5. The rotation transfer means of claim 4 comprising:

a clutch ring assembly with clutch actuator wedges; and, a helical clutch coil, whereby a decreasing radius, grips the output power shaft and transfers rotation to the output power shaft.

6. The four-cycle, rotary, electromagnetic, internal combustion engine according to claim 4 further comprising:

reference and look-up tables for the spontaneous combustion curve of the fuel, in terms of ozone concentration introduced into the combustion chamber versus the temperature of the combustion mixture and the compression ratio or pressure of the combustion mixture;

temperature and pressure sensors provided at the combustion sector whereby temperature and pressure, of the combustion mixture, are detected;

carbon monoxide and nitrogen oxides sensors provided at the exhaust sector whereby carbon monoxide and nitrogen oxides are detected in the combustion exhaust products;

ozone generator provided at the intake slot whereby ozone is added to the intake air; and, ozone concentration sensors provided at the intake slot, wherein the ozone concentration is adjusted to initiate spontaneous combustion in the combustion sector and to minimize carbon monoxide and nitrogen oxides in the combustion exhaust products.

* * * * *

UNITED STATES PATENT AND TRADEMARK OFFICE
CERTIFICATE OF CORRECTION

PATENT NO. : 6,948,473 B2
DATED : September 27, 2005
INVENTOR(S) : Udy

It is certified that error appears in the above-identified patent and that said Letters Patent is hereby corrected as shown below:

<u>Drawings,</u>
Add drawing sheet number 5 attached.

Signed and Sealed this

Thirteenth Day of June, 2006

JON W. DUDAS
*Director of the United States Patent and Trademark Office*

Drawing Numbers Key 1. interior wall of engine case
2. joined, interdigitated, alternating hub section, hinged-hub impeller
3. joined, interdigitated, alternating hub section, hinged-hub impeller
4. intake air
5. electromagnets on outside of engine wall
6. fuel injection
7. exhaust gases
8. power shaft
9. end hinged-hub impeller node
10. interior hinged-hub impeller node
10a. interior hinged-hub impeller node, machined joints on vanes
11. end cap
12. engine case
13. intake slot
14. electromagnet mounting to case
15. exhaust slot
16. end cap mounting, case side
17. fuel injectors
18. fuel igniter
19. null,
20. end cap mounting, cap side
21. magnetically disengaged clutch ring assembly, rotation transfer means
22. representation of hinged-hub impellers on power shaft assembly
23. keyed hole for impeller hub
24. flat, wide, helical clutch coil/ring with opposed fingers
25. magnetically disengaged, spring loaded, clutch actuator wedges
26. rotating electric contacts for controlling impeller vane electromagnets
27. engine assembly
28. air intake, air filter, and ozone generator unit
29. exhaust gas chute
30. rotary engine control box and wire harness
31. fuel injectors and fuel igniters
32. impeller vane weld lines/joints.

end